United States Patent Office 3,110,669
Patented Nov. 12, 1963

3,110,669
HIGH TEMPERATURE LUBRICANTS
Arthur C. Borg, Chicago, Ill., assignor to Standard Oil Company, Chicago, Ill., a corporation of Indiana
No Drawing. Filed Nov. 30, 1961, Ser. No. 156,140
4 Claims. (Cl. 252—28)

This invention pertains to novel lubricant greases and to their method of preparation. More particularly, it concerns novel greases comprising a lubricant vehicle thickened with certain high melting aryl carbamyl compounds and glass micro-fibers. A grease of this type, wherein the lubricant vehicle comprises a silicone polymer oil, has demonstrated excellent stability and lubricity at elevated temperatures.

As lubricants are required to perform at higher and higher temperatures, because of increased speeds of engines and machines, jet propulsion, atomic energy as a source of power, etc., it has become increasingly difficult to prepare suitable greases. In attempting to provide satisfactory lubricants, the art has progressed from the use of petroleum oil thickened with metal soaps of long chain fatty acids, e.g. lithium hydroxystearate, to more thermally stable lubricating oils such as the aliphatic diesters of dicarboxylic acids, silicone polymers, etc., thickened with gelling agents such as silica gel. However, at temperatures as high as 400° to 450° F. there are few greases available which will retain their consistency and lubricity for any substantial period of time.

Various normally liquid synthetic lubricants, e.g. the silicones, fluorocarbons, etc., thickened with certain high melting aromatic ureas, diureas, amides and diamides, broadly within the class of aryl carbamyl compounds, have produced greases which are stable and display excellent lubricant properties at high temperatures. Examples of such grease compositions and methods of preparing the organic aryl carbamyl thickeners are taught in U.S. 2,710,839, U.S. 2,710,840 and U.S. 2,710,841. The organic thickening agents described in these patents are superior to thickening agents known in the prior art since they provide, with suitable lubricant vehicles, e.g., silicone polymer oils, excellent lubrication at temperatures as high as 450° F. for substantial periods of time. Lubricants such as the aforementioned silicone polymer oils, or such as mineral lubricating oils derived from petroleum, synthetic lubricating oils, e.g. polyalkylene glycols and their derivatives, high molecular weight esters of dicarboxylic acids, etc., may be thickened to grease consistency by the addition thereto of from 5 to 70 percent and preferably from about 10 to about 50 percent of an aryl carbamyl compound selected from the group consisting of aromatic ureas, diureas, amides and diamides.

I have found that a small amount of a micro-fibrous glass material, e.g. 1 percent, will permit a surprisingly great reduction, e.g. 60 to 70 percent, in the amount of organic thickener required to prepare a grease suitable for high temperature use. It is obvious that any reduction in the amount of thickening agent which allows more oil to be incorporated in grease is generally desirable from the standpoint of lubricating properties. Additionally, relatively inexpensive micro-fibrous glass replaces some of the expensive organic thickening agent. It is undesirable to replace all the organic thickener with micro-fibrous glass, however, for a grease so compounded will not hold its oil component at high temperatures as well as a grease containing a minor proportion of one of the aforementioned organic thickeners.

The micro-fibrous glass which may be employed in accordance with this invention is any fibrous glass material of small diameter which will disperse readily in a lubricant vehicle. The glass composition is not critical and vehicles. Particularly desirable thickeners may be pre-micro-fibers prepared from a general purpose glass are entirely satisfactory. The glass fiber diameter may range from about 0.05 micron to about 0.80 micron. The length of the fiber will be partially determined by the amount of process mixing in grease preparation, and is not critical. A particularly suitable micro-fibrous glass for use in accordance with this invention is Industry Code AAAA glass fiber which has a diameter of from about 0.20 micron to about 0.499 micron (available as Johns-Manville Code 104 Micro-Fibers). The micro-fibrous glass provides a desirable thickening effect when added to a lubricant vehicle to the extent of from about 0.25 percent to about 2 percent by weight.

The silicone polymer oils which may be employed in accordance with the present invention are those falling substantially within the lubricating oil viscosity range. In general, such oils have the following unit structure:

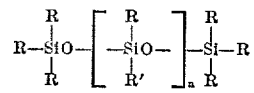

wherein R and R' represent substituted or unsubstituted alkyl, aryl, alkaryl, aralkyl, or cycloalkyl radicals. Such components may be produced by well known methods, e.g. the hydrolysis of dialkyl dichlorosilanes with a suitable chain stopper, e.g. a tri-substituted monochlorosilane. For purposes of the present invention, suitable polymers within the lubricating oil viscosity range are those possessing a viscosity at 100° F. of from about 25 to about 3500 S.S.U. It is preferred, for purposes hereof, to employ such oils as have a viscosity at 100° F. of from about 300 to about 1250 S.S.U. Such products are generally colorless and inert, have a very low volatility and undergo relatively slight change in viscosity for a given change in temperature. A particularly desirable silicone fluid for use in accordance with this invention is one in which the substituent groups R and R' are predominantly phenyl radicals. Such a fluid is available as silicone fluid QF-6-7024 (Dow-Corning). This is a water white polymer which has a viscosity at 77° F. of about 2000 S.S.U. and at 210° F. of about 98 S.S.U.; a flash point of 610° F.; a freezing point of 23° F.; a specific gravity at 25° C. of 1.115; and a refractive index at 25° C. of 1.566. Other lubricant vehicles which may be employed are, for illustration, mineral oils in the lubricating oil viscosity range, i.e. from about 80 S.S.U. at 100° F. to about 300 S.S.U. at 210° F.

The organic thickener useful in this invention may be a high melting aromatic urea, diurea, amide, or di-amide containing the following structure:

wherein R is an aryl radical. Such organic thickeners generally have melting points in excess of about 250° F. These compounds may be referred to broadly as aryl carbamyl compounds and they are useful for thickening silicone polymer oils, as well as other known lubricant pared through the reaction of at least two different aryl isocyanates with at least one aryl amine or through the reaction of at least two different aryl monoamines with at least one aryl isocyanate. Various preparations and compositions of these thickeners are set forth in patents, e.g. U.S. 2,710,839, U.S. 2,710,840 and U.S. 2,710,841.

Suitable thickeners are such as represented by the following formulae:

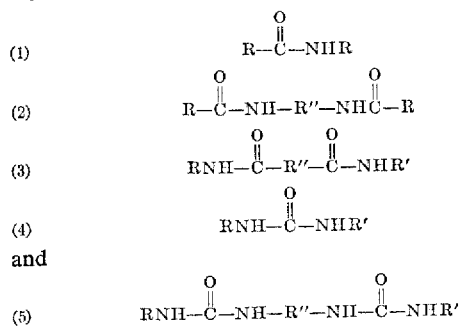

wherein R and R' represent hydrocarbon radicals containing no more than 12 cyclic carbon atoms, which radicals are selected from the group consisting of aryl, alkaryl, substituted aryl and substituted alkaryl radicals, and R" represents a divalent hydrocarbon radical, containing no more than 12 cyclic carbon atoms, which radical is selected from the group consisting of arylene, alkarylene, substituted arylene and substituted alkarylene radicals. Specific examples of useful thickeners are: N-benzoyl-p-aminobenzoic acid; N,N'-dibenzoylbenzidine; 4,4'-bis-(3-biphenylylureido)-biphenyl; 1,2-bis-(3-(4-biphenylyl)-ureido)-propane; and 4,4'-bis-(3-phenyl-ureido)-biphenyl, among others.

Greases of the subject invention may be produced by one of the following methods: (1) the thickener may be prepared separately and then mixed with the lubricant vehicle and micro-fibrous glass and milled in a colloid mill, three-roll mill, etc.; (2) the thickener may be formed in situ in the oil by introducing the reactants and the desired amount of lubricant vehicle with the micro-fibrous glass, heating to about 450° F. for a relatively short time, e.g. from about 5 to 60 minutes and then cooling and milling the mixture. It should be understood that other methods obvious to one skilled in the art, or modifications of the given methods similarly obvious, may be used. The method of forming the aryl carbamyl thickener in situ is claimed in U.S. 2,710,841.

The novel high temperature grease preferably contains by weight, from 2 to 20 percent of an aryl carbamyl thickener, from 0.25 to 2 percent of micro-fibrous glass and a major proportion of a lubricant vehicle. A satisfactory specific composition contains 5 percent organic thickener, 1 percent micro-fibrous glass and 94 percent lubricant vehicle, by weight.

A grease in accordance with this invention was prepared as follows: A kettle was charged with silicone fluid QF–6–7024 (Dow-Corning), 94 parts by weight, bitolylene diisocyanate, 2.65 parts by weight, p-chloroaniline, 1.28 parts by weight, p-toluidine, 1.07 parts by weight and micro-fibrous glass, Code AAAA (Johns-Manville Celite Division), 1 part by weight. The mixture was stirred and the resulting grease was heated with continued stirring for 4 hours at 420° F. After the grease was cooled to room temperature, it was milled to complete the preparation. The finished grease had as ASTM penetration of 289 (worked).

For comparison purposes, a grease containing only organic thickener was made as follows: Into a kettle was charged silicone fluid QF–6–7024 (Dow-Corning), 84.39 parts by weight, bitolylene diisocyanate, 8.28 parts by weight, p-chloroaniline, 3.97 parts by weight and p-toluidine, 3.36 parts by weight. The mixture was stirred and heated for four hours at 420° F. After the grease was cooled to room temperature it was milled to complete the preparation. The finished grease had an ASTM penetration of 296 (worked).

The total thickener content of the grease made according to this invention was 6 percent; that of the grease prepared with organic thickener alone was 15.61 percent.

The two greases prepared as above were compared in a bearing performance test (CRC L–35–59, Modified). It is conducted as follows:

A test bearing of SAE No. 204 size fabricated from heat resistant steel is packed with 3.2±0.1 cc. of the grease to be tested. This bearing is mounted on a test spindle enclosed in an oven. An outboard support bearing, similarly packed, is provided for the spindle. The test bearing is subjected to a temperature of 600° F. while running at 10,000 r.m.p.±100 r.p.m. until failure of the lubricant. The lubricant is considered to have failed when (1) spindle input power increases to approximately 300 percent above the steady state condition at test temperature, (2) test bearing temperature increases 20° F. over test temperature during any portion of the cycle or (3) high noise level occurs.

Multiple bearing performance tests were made of the grease containing micro-fibrous glass with organic thickener and of that containing the organic thickener alone. The average performance life of the glass-containing grease was 108.6 hours; that of the grease with no micro-fibrous glass thickener was 118.5 hours. It is evident that closely comparable greases, as respects lubricating performance, were obtained, though one contained about three times as much organic thickener as the other. The grease thickened with micro-fibrous glass had a dropping point 41° F. higher than that of the comparison grease, thus being suitable for higher temperature service. A comparison of various properties of these greases is as follows:

| Property | Greases | |
|---|---|---|
| | Micro-Fibrous Glass Grease | Comparison Grease |
| Micro-Fibrous Glass Content | 1.00 percent [1] | 0.00 percent. |
| Organic Thickener Content | 5.00 percent | 15.61 percent. |
| Penetration (Worked) | 289 | 296. |
| Bearing Performance Test (Modified CRC-L-35-59) | 103.6 hours [2] | 118.5 hours.[3] |
| Dropping Point | 621° F | 480° F. |

[1] Percentages given by weight.
[2] Average of three runs.
[3] Average of two runs.

After evaporation of lubricant vehicle under high temperature service, a grease thickened only with organic aryl carbamyl thickener leaves a hard, gritty residue. In contrast, a grease made with micro-fibrous glass leaves a soft, spongy mat; this mat may be reconstituted to a serviceable lubricating material by the addition of lubricant vehicle, with or without supplementary organic thickener.

Greases of the present invention may have added thereto antioxidants, oiliness agents, extreme pressure additives, etc. without in any way departing from the scope of the present invention.

Having thus described my invention, what I claim as novel and desire to protect by Letters Patent is defined by the following claims:

1. A lubricant grease composition comprising:
 (a) a silicone lubricant vehicle,
 (b) an organic thickener selected from the group consisting of

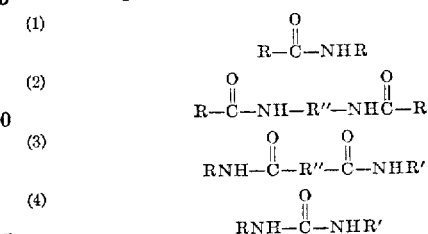

and (5) $$RNH-\overset{O}{\underset{\|}{C}}-NH-R''-NH-\overset{O}{\underset{\|}{C}}-NHR'$$

wherein R and R' represent hydrocarbon radicals containing no more than 12 cyclic carbon atoms, which radicals are selected from the group consisting of aryl, alkaryl, substituted aryl and substituted alkaryl radicals, and R" represents a divalent hydrocarbon radical, containing no more than 12 cyclic carbon atoms, which radical is selected from the group consisting of arylene, alkarylene, substituted arylene and substituted alkarylene radicals, and (c) a minor proportion of micro-fibrous glass.

2. A lubricant grease composition comprising:
(a) normally liquid silicone lubricant vehicle,
(b) from about 2 to about 20 parts by weight of an organic thickener selected from the group consisting of (1) $$R-\overset{O}{\underset{\|}{C}}-NHR$$

(2) $$R-\overset{O}{\underset{\|}{C}}-NH-R''-NH\overset{O}{\underset{\|}{C}}-R$$

(3) $$RNH-\overset{O}{\underset{\|}{C}}-R''-\overset{O}{\underset{\|}{C}}-NHR'$$

(4) $$RNH-\overset{O}{\underset{\|}{C}}-NHR'$$

and (5) $$RNH-\overset{O}{\underset{\|}{C}}-NH-R''-NH-\overset{O}{\underset{\|}{C}}-NHR'$$

wherein R and R' represent hydrocarbon radicals containing no more than 12 cyclic carbon atoms, which radicals are selected from the group consisting of aryl, alkaryl, substituted aryl and substituted alkaryl radicals, and R" represents a divalent hydrocarbon radical, containing no more than 12 cyclic carbon atoms, which radical is selected from the group consisting of arylene, alkarylene, substituted arylene and substituted alkarylene radicals, and (c) from about 0.25 to about 2.00 parts by weight of micro-fibrous glass.

3. A lubricant grease composition comprising:
(a) a major proportion of a silicone polymer oil having a viscosity at 100° F. of from about 300 S.S.U. to about 1250 S.S.U., (b) from about 2 to about 20 parts by weight of an organic thickener, melting above 250° F., selected from the group consisting of (1) $$R-\overset{O}{\underset{\|}{C}}-NHR$$

(2) $$R-\overset{O}{\underset{\|}{C}}-NH-R''-NH\overset{O}{\underset{\|}{C}}-R$$

(3) $$RNH-\overset{O}{\underset{\|}{C}}-R''-\overset{O}{\underset{\|}{C}}-NHR'$$

(4) $$RNH-\overset{O}{\underset{\|}{C}}-NHR'$$

and (5) $$RNH-\overset{O}{\underset{\|}{C}}-NH-R''-NH-\overset{O}{\underset{\|}{C}}-NHR'$$

wherein R and R' represent hydrocarbon radicals containing no more than 12 cyclic carbon atoms, which radicals are selected from the group consisting of aryl, alkaryl, substituted aryl and substituted alkaryl radicals, and R" represents a divalent hydrocarbon radical, containing no more than 12 cyclic carbon atoms, which radical is selected from the group consisting of arylene, alkarylene, substituted arylene and substituted alkarylene radicals, and (c) from about 0.25 to about 2.00 parts by weight of micro-fibrous glass, said glas having a diameter of from about 0.05 to about 0.80 micron.

4. A lubricant grease composition comprising:
(a) a major proportion of a normally liquid silicone polymer oil in the lubricating oil viscosity range,
(b) about 5 parts by weight of an organic thickener having the formula $$RNH-\overset{O}{\underset{\|}{C}}-R''-\overset{O}{\underset{\|}{C}}-NHR'$$

wherein R represents a tolyl radical, R" represents a bitolylene radical and R' represents a mono-chlorinated phenyl radical, and (c) about 1 part by weight of micro-fibrous glass having a diameter of from about 0.2 to about 0.5 micron.

References Cited in the file of this patent
UNITED STATES PATENTS

| | | |
|---|---|---|
| 2,710,839 | Swakon et al. | June 14, 1955 |
| 2,710,840 | Swakon et al. | June 14, 1955 |
| 2,710,841 | Swakon et al. | June 14, 1955 |
| 2,900,338 | Postelnek | Aug. 18, 1959 |

UNITED STATES PATENT OFFICE
CERTIFICATE OF CORRECTION

Patent No. 3,110,669                  November 12, 1963

Arthur C. Borg

It is hereby certified that error appears in the above numbered patent requiring correction and that the said Letters Patent should read as corrected below.

Column 2, line 4, strike out "vehicles. Particularly desirable thickeners may be pre-" and insert the same after "lubricant" in line 63, same column 2; column 3, line 61, for "as" read -- an --; column 4, in the table, under the heading "Comparison Grease", last entry, for "480° F." read -- 580° F. --; column 6, line 27, for "glas" read -- glass --.

Signed and sealed this 28th day of April 1964.

(SEAL)
Attest:
ERNEST W. SWIDER

Attesting Officer

EDWARD J. BRENNER
Commissioner of Patents